United States Patent [19]

Kuzunuki et al.

[11] Patent Number: 4,860,372
[45] Date of Patent: Aug. 22, 1989

[54] REAL TIME HANDWRITTEN CHARACTER INPUT SYSTEM

[75] Inventors: Soshiro Kuzunuki, Katsuta; Hiroshi Shojima, Hitachi; Masaki Miura, Hitachi; Junko Mori, Hitachi; Toshimi Mifune, Hitachi, all of Japan

[73] Assignee: Hitachi, Ltd., Tokyo, Japan

[21] Appl. No.: 897,836

[22] Filed: Aug. 19, 1986

[30] Foreign Application Priority Data

Aug. 28, 1985 [JP] Japan .................................. 60-187258

[51] Int. Cl.[4] ............................................. G06K 9/00
[52] U.S. Cl. ...................................... 382/13; 340/708; 178/18
[58] Field of Search .................. 382/13; 340/707, 708, 340/712, 726, 792; 178/18, 19

[56] References Cited

U.S. PATENT DOCUMENTS

| 4,408,302 | 10/1983 | Fessel et al. | 340/792 |
| 4,550,438 | 10/1985 | Convis et al. | 178/18 |
| 4,553,261 | 11/1985 | Froessl | 340/707 |
| 4,562,304 | 12/1985 | Ward et al. | 382/13 |
| 4,624,587 | 11/1986 | Ueno et al. | 340/792 |
| 4,639,720 | 1/1987 | Rympalski et al. | 340/707 |
| 4,641,354 | 2/1987 | Fukunaga et al. | 382/13 |
| 4,672,677 | 6/1987 | Yamakawa | 382/13 |
| 4,680,804 | 7/1987 | Kuzunuki et al. | 382/13 |

Primary Examiner—Leo H. Boudreau
Assistant Examiner—Donald J. Daley
Attorney, Agent, or Firm—Antonelli, Terry & Wands

[57] ABSTRACT

A plurality of handwritten character input buffers are provided to form a circular buffer by connecting both end character input buffers. The circular buffer is provided with a cursor pointer for indicating the position of the buffer where a recognized character is loaded. Every time a character is recognized, its character code is loaded at the buffer indicated by the content of the cursor pointer and thereafter, the content of the cursor pointer is incremented by 1. At least an input buffer after the buffer indicated by the content of the cursor pointer, where a handwritten character is next written, is cleared. Then, the content of the character input buffer is displayed on a display.

13 Claims, 8 Drawing Sheets

REAL TIME HANDWRITTEN CHARACTER INPUT SYSTEM

BACKGROUND OF THE INVENTION

The present invention relates to a character input system for inputting characters to a handwritten character recognizing device, and more particularly to a character input system having character input buffers for plural characters which suitable for consecutively inputting characters.

A plurality of character input buffers and a display area are commonly provided for inputting characters in a handwritten character recognizing device so that characters are sequentially inputted to the buffer areas. With this method, it is common to depress an "execution" or "transfer" key to collectively transfer the characters in the buffer areas to the display. For example, in the Proceedings of 26th (the first half year of 1983) National Meting of Information Processing Society of Japan, 4H-11, pp. 1313-1314, there is disclosed a method whereby characters are sequentially inputted to a data input window, and a plurality of characters in the input buffer areas are inputted at desired positions in the tablet by depressing an "ENTER" key. Obviously, this method may also be applied to a Japanese word processor using an ordinary keyboard input.

Recently, a handwriting word processor has become of practical use. A character input/display area for one character is provided in the handwriting word processor. After inputting a character, this character is transferred to another character display area by designating a character type mode (Kanji character, Japanese cursive syllabary, straight-lined Japanese syllabary).

However, in case of a handwritten character input, the operation required for the operator such as transfer of one character at a time or collective transfer of a plurality of characters upon depression of an "execution" or "transfer" key after they have been inputted, results in a problem that the operator's thinking process is interrupted. It is desirable to input handwritten characters in real time.

SUMMARY OF THE INVENTION

The present invention has been made in view of the above problem, and an object of the present invention is to provide a real time handwritten character input system suitable for consecutively inputting characters without designating an instruction such as by depression of an "execution" key.

To this end, in the present invention, a plurality of character input buffers for plural characters are provided, and the character input buffers are connected at both ends to form a circular buffer. For use in storing a recognized character, there is provided a cyclic cursor pointer for the circular buffer. Thus, each time a character is recognized, its character code is loaded in the buffer identified by the cursor pointer and thereafter the content of the cursor pointer is incremented by one. Then, a predetermined number of buffer areas after the one identified by the cursor pointer, are cleared for use with characters to be inputted. Lastly, the content of the character buffer is displayed on another display different from the buffer.

The input of a handwritten character and its recognizing timing is managed based on rectangular measures provided on the character input buffer areas.

Every time a character is recognized, a vacant rectangular measure (space) of the buffer is secured for writing a next character. Therefore, the operator can consecutively input characters to the character input buffers to thereby prevent interruption of the operator's thinking process.

DESCRIPTION OF THE PREFERRED EMBODIMENTS

An embodiment of the present invention will be described in detail with reference to FIGS. 1 to 9.

Figure 1:
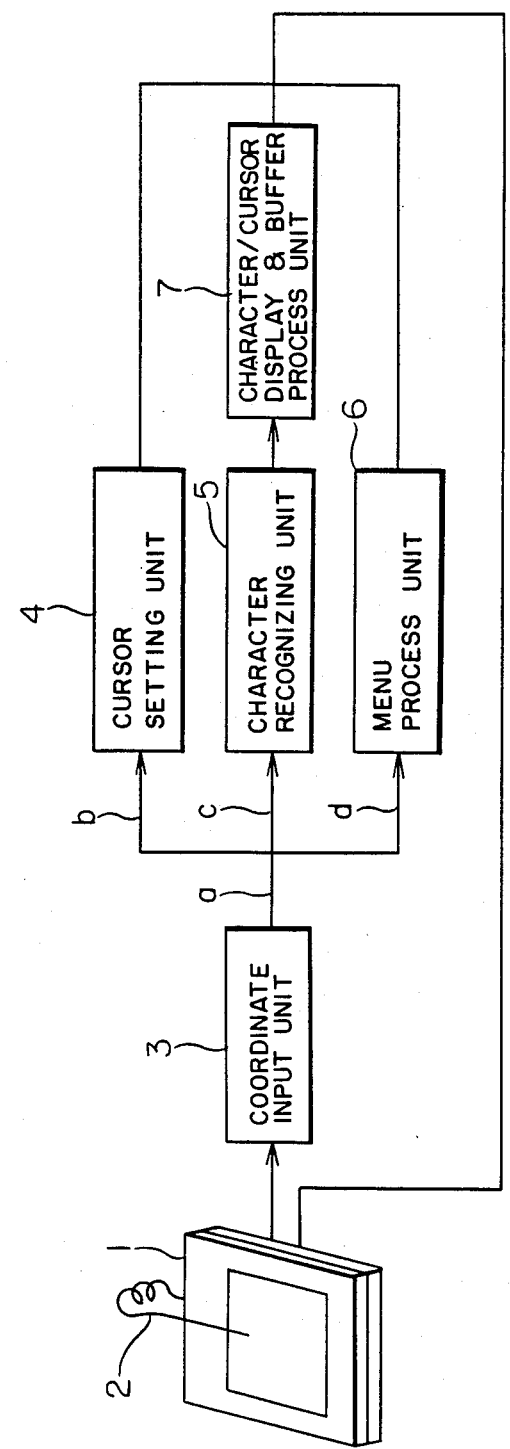
FIG. 1 is a block diagram of the real time handwritten character input system according to an embodiment of the present invention.

FIG. 1 is a block diagram showing the embodiment of the present invention.

An input integrated display 1 has a liquid crystal display portion and a tablet input portion, the two portions being integrally formed. A stylus pen 2 is used for inputting characters. A coordinate input unit 3 determines coordinates on the input integrated display 1. The output a of the coordinate input unit 3 is branched as signals b, c and d which are respectively inputted to a cursor setting unit 4, a character recognizing unit 5 and a menu process unit 6, where they are subject to particular processing. The output of the character recognizing unit 5 is supplied to a character/cursor display and buffer clear process unit 7 to display characters on the input integrated display 1.

Since a character is inputted with the stylus pen 2 and displayed, the writing operation is the same as a conventional one with paper and pencil.

The input integrated display is disclosed, for example, in Jp-A-No. 208877 and JP-A-No. 58-14247.

Figure 2:
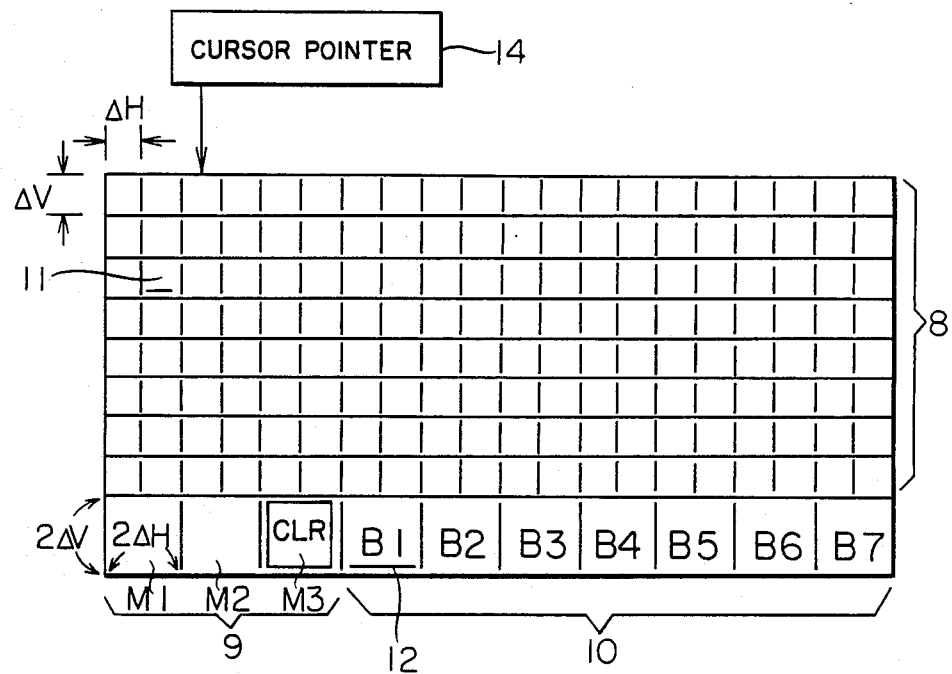
FIGS. 2, 3, 4a, 4b and 5 show the conception of the embodiment.

FIG. 2 shows a screen layout of the input integrated display 1. The screen is mainly divided into (1) a character display area 8, (2) a menu area 9 and (3) a character input buffer area 10.

On the character display area 8, there are rectangular areas for use in displaying 8 characters in the horizontal direction and 20 character rows in the vertical direction. The rectangular areas each have a horizontal width $\Delta H$ and a vertical width $\Delta V$.

The menu area 9 has three menus (M1 to M3). The menu M3 is a "clear" menu for erasing the contents of character input buffers, as will be described later. The other two menus are vacant menus. The widths of the menu rectangular measure are $2\Delta V$ and $2\Delta H$.

The character input buffer area 10 is an area where handwritten characters are written and recognized characters are displayed. The number of buffers are 7 corresponding to the same number of characters (B1 to B7).

Cursor representations 11 and 12 are provided for the character display area 8 and the character input buffer area 10, respectively. A character in the character input buffer 10 indicated by the cursor representation 12 is transferred onto the character display area 8 indicated by the other cursor representation 11. The positions of the cursor representations 11 and 12 are decided by cursor pointers 14 and 13, respectively. The character transfer is automatically performed by the process at the block 7 of FIG. 1, as described previously, every time one character is recognized.

Figure 3:
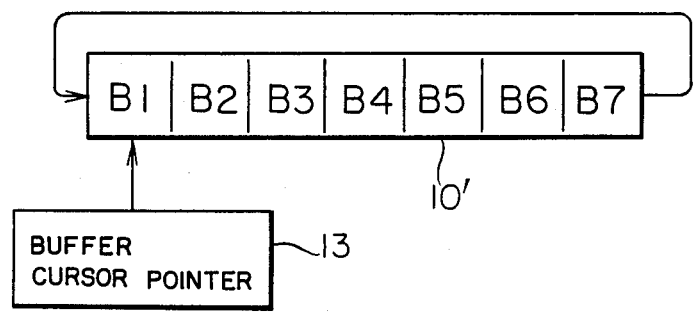

FIG. 3 shows the management concept of the character input buffers B1 to B7, which are controlled as a circular buffer by connecting both ends thereof. For this purpose, there is provided a register for the cursor pointer 13 identifying a particular character input buffer 10'. The content of the register is set so as to identify the character input buffer B1 when the power source is reset or when the above-described "clear" menu is designated. Every time one character is recognized, the cursor pointer 13 is incremented. After the buffer B7 is designated, the buffer B1 is designated to thereby use the character input buffer 10' as a circular buffer.

Figure 4A:
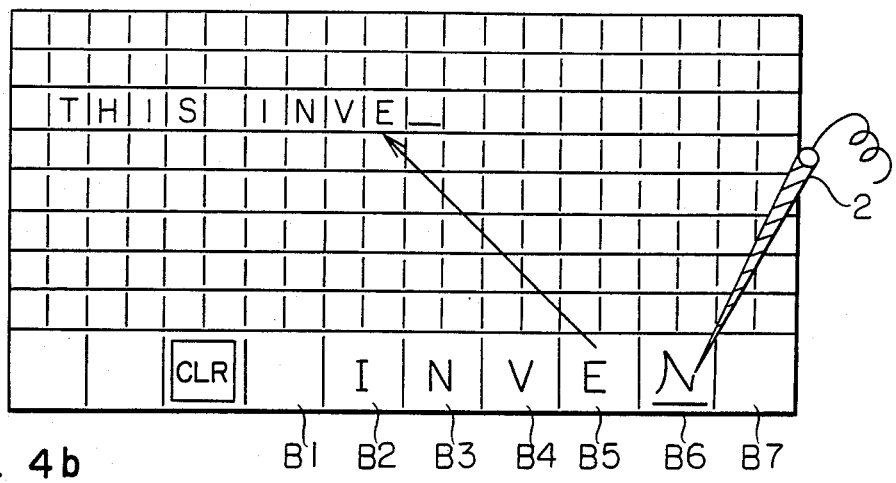
Figure 4B:
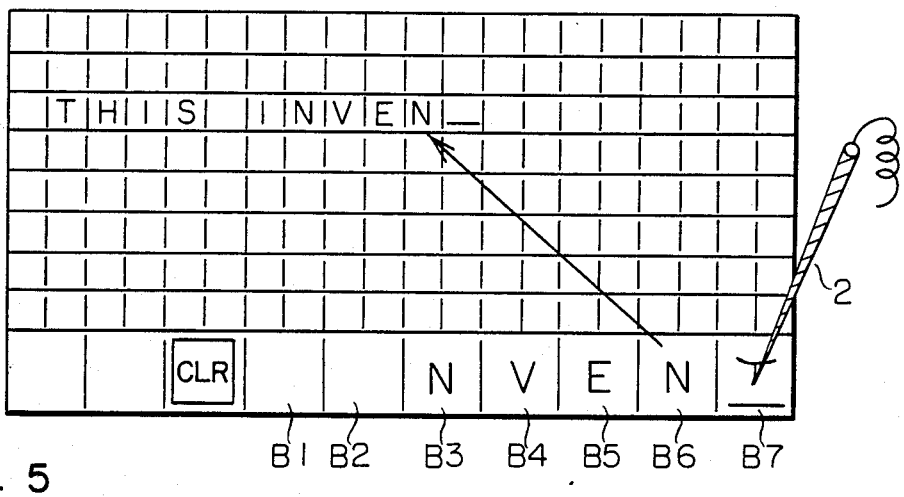

FIGS. 4a and 4b show an example of a character input procedure.

FIG. 4a shows the state that a handwritten character "N" is being written on the rectangular area on the character input buffer B6, after confirming the cursor representation and inputting "THIS INVE" with the stylus pen 2. More precisely, the characters "THIS INVE" have already been recognized and are displayed on the character buffer areas and the character display areas in the form of clear characters. However, since the number of character input buffers are 7 as described above, it is necessary to clear some of the buffers, which is the gist of the present invention. The example of FIG. 4a indicates that the buffer B1 which is 5 characters before the cursor position or 2 characters after the cursor position, has been cleared.

FIG. 4b shows the state that a character "N" has been recognized after the state of FIG. 4a and a handwritten character "T" is being inputted to the buffer B7. In this case also, the buffer B2 which is 5 characters before the cursor position has been cleared.

As described above, since at least one buffer among the seven character input buffers is cleared, a new character can be consecutively inputted to the cleared buffers. In the example of FIGS. 4a and 4b, two buffers are made empty for use with two characters. In view of a handwritten character input speed per one Kanji character (1 to 5 sec/character) and a recognizing speed (0.2 to 1.0 sec/character), spaces for two characters are always retained. Therefore, consecutive character input can be performed while obtaining a clear distinction between words by inserting a space therebetween.

In the embodiment shown in FIGS. 2 to 4, the number Nb of character input buffers and the number Nc of character buffers to be cleared are set as 7 and 5, respectively. These numbers may be optional so long as the following formulas are satisfied:

$Nb \geq Nc+1$ $Nb > 2$

The reason why such numbers are adopted in the present embodiment is that generally Japanese language has a word length of 5 characters/word assuming that punctuation marks, particles and word's endings represent separations between words. Thus, Nc=5 together with one space has been considered to use $Nb=5+1+1=7$. As to English and other languages, the number Nc will be increased to an appropriate value.

Figure 5:
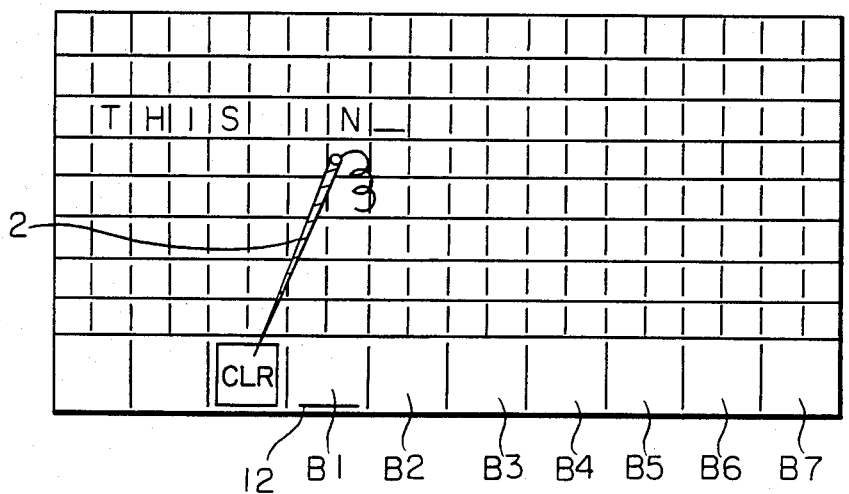

FIG. 5 shows the state in which after a character is written on the character input buffer B7 area, the "clear" menu on the menu area has been designated. In particular, this "clear" menu command enables clearing of all the character input buffers and the cursor representation is displayed on the head buffer B1. This command is used to erase the contents of buffers when a thinking process is desired to be refreshed for inputting a new paragraph. Clearing all the character input buffers is also carried out for the same reason as above when the cursor position on the character display area is to be indicated (to be later described with FIG. 7).

The above description has been directed to the concept of the embodiment of the present invention. The following is a more detailed description of the embodiment. Since the functions of blocks 3 to 7 of FIG. 1 are achieved by a microcomputer process, the description is given with reference to flow charts.

Figure 6:
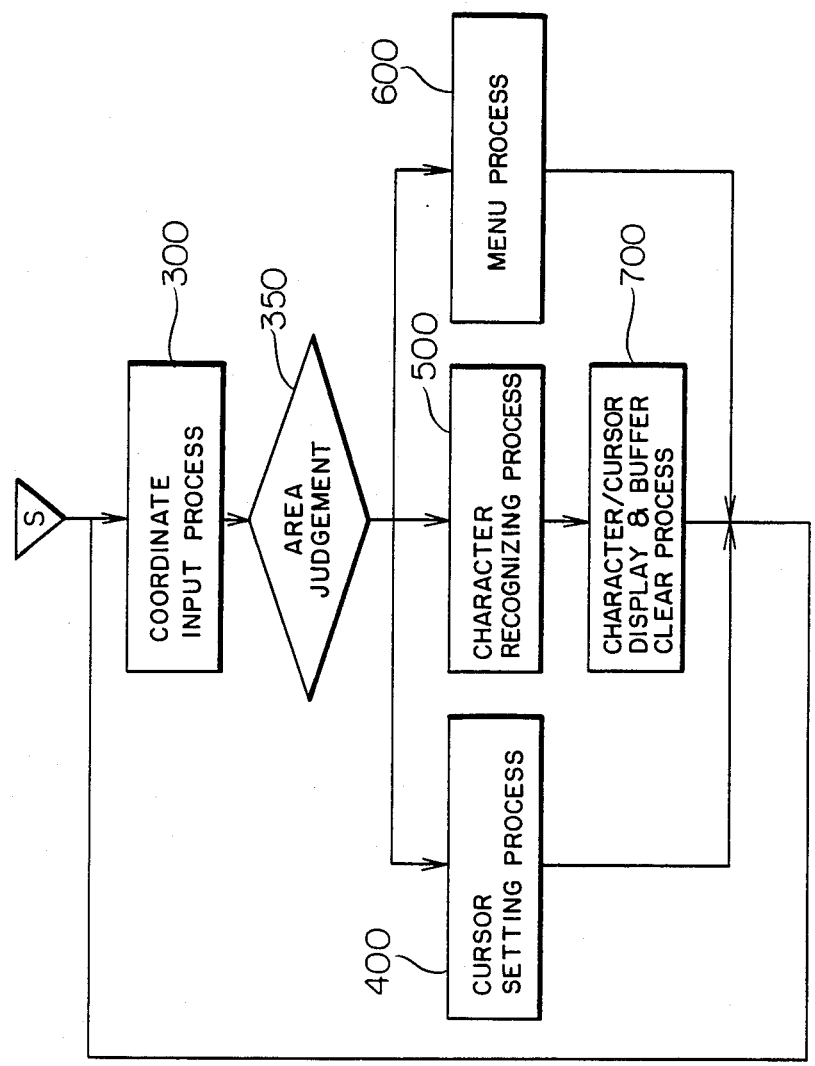
FIGS. 6, 7, 8 and 9 are process flow charts of the embodiment in the form of software.

FIG. 6 shows a process flow of the main program. First, a process for receiving a coordinate (X, Y) inputted from the input integrated display is executed (step 300). Based on the received coordinate, it is judged which area among the character display area, character input buffer area and menu area is to be processed (step 350). In case of the character display area, a cursor setting process is executed (step 400), in case of the character input buffer area a character recognizing process is executed (step 500), in case of the character/cursor display and buffer clear process is executed (step 700), and lastly in case of the menu area, a menu process is executed (step 600). Thereafter, the flow returns to the coordinate input process.

The steps 400 to 700 of the above process flow will be described in detail. However, since the character recognizing process (step 500) is already disclosed, for example, in JP-A-48-8130 and JP-A-48-46227, the description therefor is omitted and the remaining processes will be described below.

Figure 7:
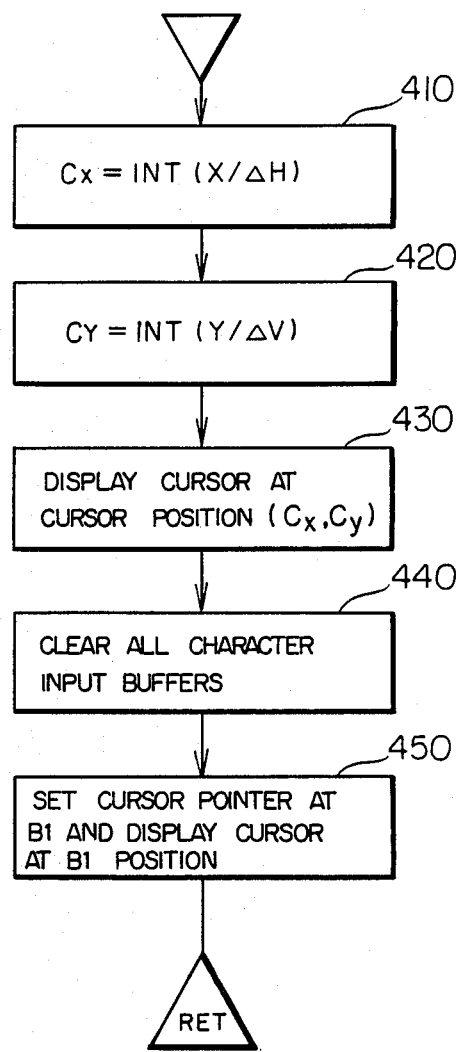

FIG. 7 shows a detailed flow of the cursor setting process (step 400). First, at steps 410 and 420, the cursor position on the character display area is calculated. That is, the cursor position Cx in the X-direction and the cursor position Cy in the Y-direction are determined as follows:

$Cx = iNT(X/\Delta H)$ $Cy = iNT(Y/\Delta V)$ where X and Y are pen-down coordinates of the stylus pen 2 assuming that the upper most left is an origin, $\Delta H$ and $\Delta V$ are widths of a single rectangular measure in the X-and Y-directions, respectively, and iNT is a function for changing the value in ( ) to an integer.

Next, a cursor representation is displayed at the cursor position (Cx, Cy) (step 430). Thereafter, all the character input buffers are cleared (step 440) to set the content of the cursor pointer of the character input buffers at the buffer B1 and display the cursor representation at the buffer B1 area (step 450). The resultant screen will become such as shown in FIG. 2.

Figure 8:
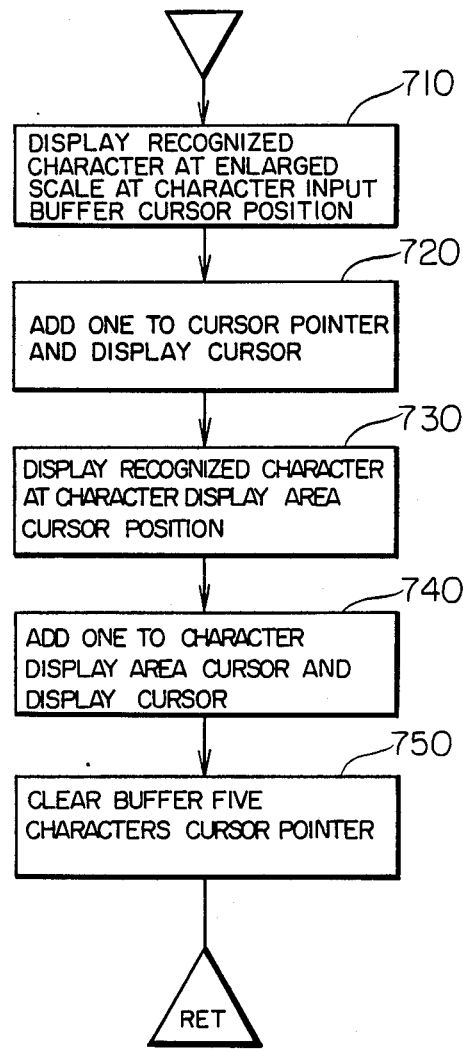

FIG. 8 is a detailed flow chart of the character/cursor display and buffer clear process (step 700) which is executed after the character recognizing process (step 500 of FIG. 6) is executed. First, using a character code obtained by the character recognizing process, the character is displayed at an enlarged scale at the cursor position 12 on the character input display buffer area (step 710) and thereafter, the cursor pointer is incremented by 1 (step 720). Next, the character corresponding to the same character code is displayed at the cursor position (Cx, Cy) on the character display area (step 730) and thereafter, the cursor pointer of the character display area is incremented by 1 (Particularly, $Cx=Cx+1$ or $Cx=1$ in case of $Cx \div 21$, and $Cy=Cy+1$) (step 740). Lastly, the buffer which is 5 characters before the one identified by the cursor pointer of the character input buffers (i.e., the buffer which is 1 character after the one identified by the cursor pointer), is cleared to complete the flow (step 750).

Figure 9:
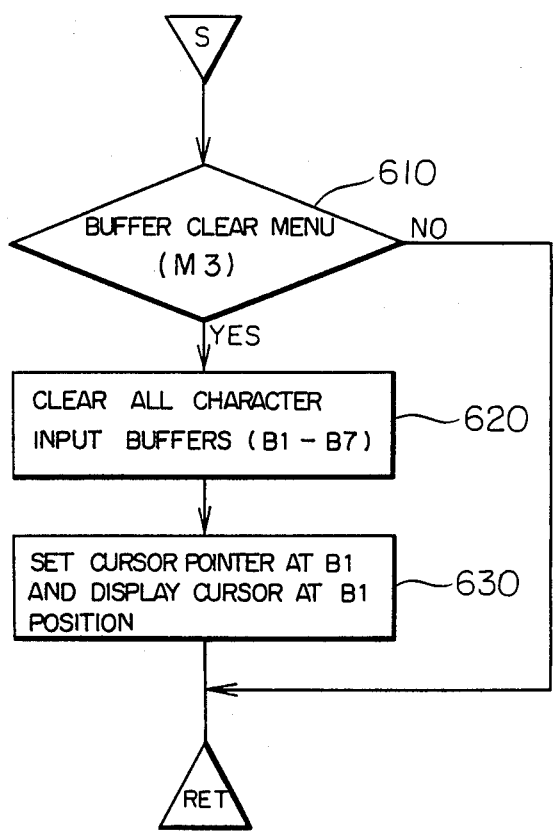

FIG. 9 shows a detailed flow when the menu area is designated. First, it is judged if the designated one is the menu (M3) or not (step 610). In case of clearing all the buffers, they (B1 to B7) are cleared (step 620). Next, the cursor pointer of the character input buffers is set at the buffer B1 to display the cursor representation at the position of the buffer B1 area (step 630). Thus, the flow is completed.

From the foregoing detailed description of the embodiment of the present invention, it can be said that the following advantageous effects are obtained:

As a first effect, since characters in the character input buffers are sequentially processed without giving instruction such as "execution" or "transfer" as conventional and handwritten characters can consecutively be inputted, a man-machine interface is remarkably improved without any interruption of the operator's thinking process.

As a second effect, since 7 characters are used on the character input buffer areas, a word having an ordinary word length (5 characters) can be displayed within the character input buffer areas, thereby enabling an easy thinking process for inputting the following phrase.

As a third effect, since an empty area corresponding to 2 characters at an ordinary input speed is spared within the character input buffer area, a distinction between words can be seen clearly to accordingly enable an easy handwritten character input.

As a fourth effect, since a cursor representation is displayed on both the character display area and the character input buffer area, the correspondence between characters displayed on the areas is readily recognized to enable an easy handwritten character input.

As a fifth effect, since an input integrated display is used in the present embodiment, the same character input operation as a conventional one with paper and pencil can be achieved, thereby remarkably improving a man-machine interface.

Next, modifications of the above embodiment of the present invention will be described.

In the embodiment shown in FIG. 1, an input integrated display with a liquid crystal and a tablet integrated in one panel is used as a device for inputting and displaying characters. However, other devices such as a CRT display and a separate tablet may be used without using an input integrated display. Further, although the character input buffer area and the character display area is formed on the same device in the above embodiment, the respective areas may be formed separately on different devices. For instance, the character input buffer area may be formed on a CRT display, while the character display area may be formed on an input integrated display. With such construction, the advantageous effects of the present invention can also be attained.

Further, although the layout of the character input buffer area and the character display area as shown in FIG. 2 is employed in the above embodiment, a so-called multi-window may be used wherein the character input buffer area is superposed within the character display area.

Furthermore, although seven character input buffers are used, any number more than two can afford the advantageous effects of the present invention. However, if the number of buffers is too small, a word having meaning cannot be displayed within the character input buffer areas so that it is inconvenient for the operator inputting characters.

The modifications described above can also afford the advantageous effects of the previously described embodiment of the present invention.

Although use of a cursor representation on the character input buffer area improves a man-machine interface, this representation may be omitted so long as the position where a character is next inputted can be readily located. Also in such a case, the above advantageous effects can be retained.

As seen from the foregoing description of the present invention, handwritten character input using character input buffers can be carried out without a need of instruction to transfer the inputted characters. In addition, clearing the contents of character input buffers where new characters are to be inputted, is automatically executed so that consecutive character input is possible without interrupting the operator's thinking process to thereby remarkably improve a man-machine interface.

Next, another embodiment of the present invention will be described with reference to FIGS. 10 to 12.

Instead of the circular buffer with both end buffers connected together as shown in FIG. 3 of the first embodiment, another configuration of the circular buffer is used in this embodiment. As shown in FIG. 10, this circular buffer is configured such that if a cursor pointer 13' reaches the buffer B5, the cursor pointer circulates within the buffers B5 to B7 until buffers where new characters are inputted are cleared. Every time a new handwritten character is recognized, the contents of the character input buffers B2 to B4 are shifted to the left by one character and the newly recognized character is loaded in the buffer B4 for displaying it. Therefore, the late word or words are always displayed on the input buffers B1 to B4, as is different from those in FIG. 3.

Figure 11A:
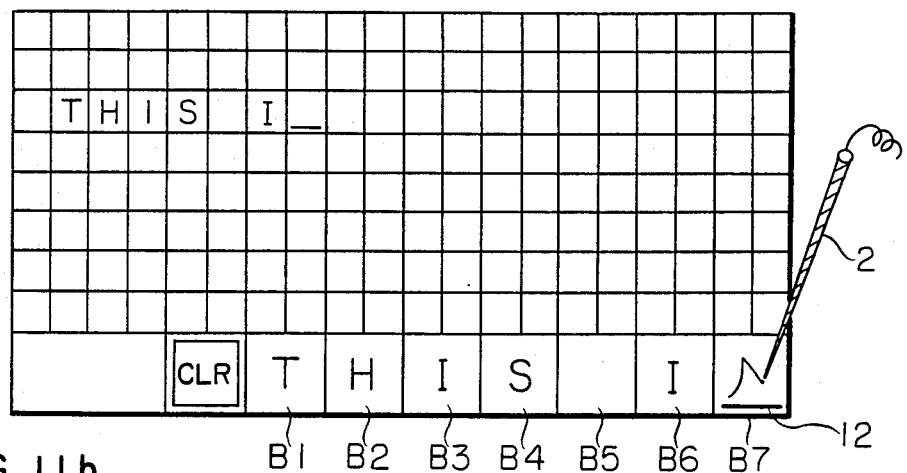
Figure 11B:
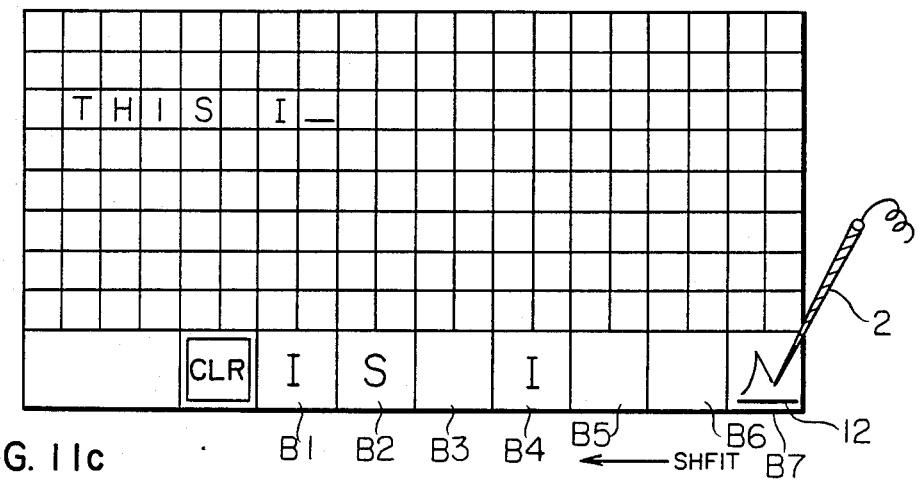
Figure 11C:
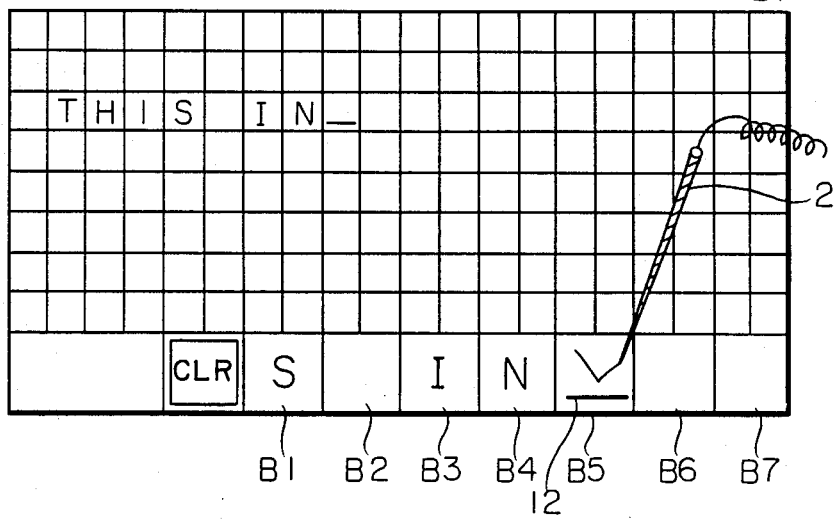

The above operation is illustrated in more detail in FIGS. 11a, 11b and 11c. FIG. 11a shows the state that after all the character input buffers are cleared, characters have been inputted in the buffers B1 to B6, the recognized characters being displayed on the buffers B1 to B5 in the form of clear characters. Upon start of handwriting a character on the buffer B7, the character inputted in the buffer B6 is recognized.

After completing recognizing the handwritten character in the buffer B6, the contents of the buffers B3 to B5 are transferred to the buffers B1 to B3 as shown in FIG. 11b and the character recognized at that time, i.e., "I" is displayed on the buffer B4.

Figure 10:
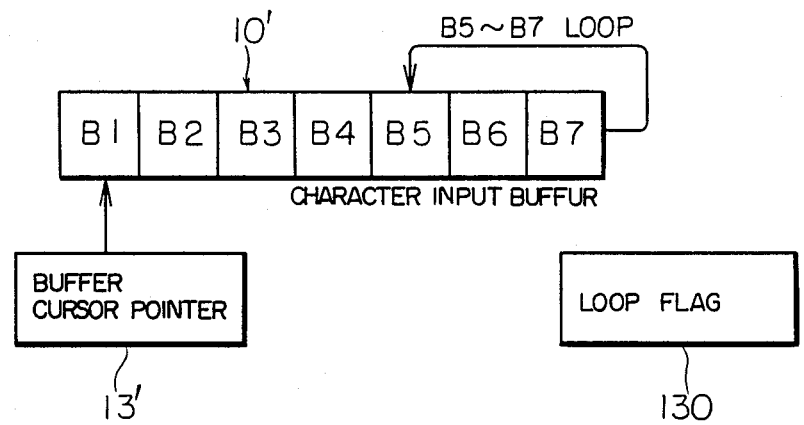
FIGS. 10, 11a, 11b, 11c and 12 show the conception of another embodiment according to the present invention.

Next, since the cursor pointer of the input buffers operate circularly as shown in FIG. 10, the cursor pointer indicates the buffer B5 as shown in FIG. 11c after the handwritten character "N" is recognized. Thereafter, every time a new handwritten character is recognized, the cursor pointer changes its indication in the order of B6→B7→B5→B6.

Figure 12:
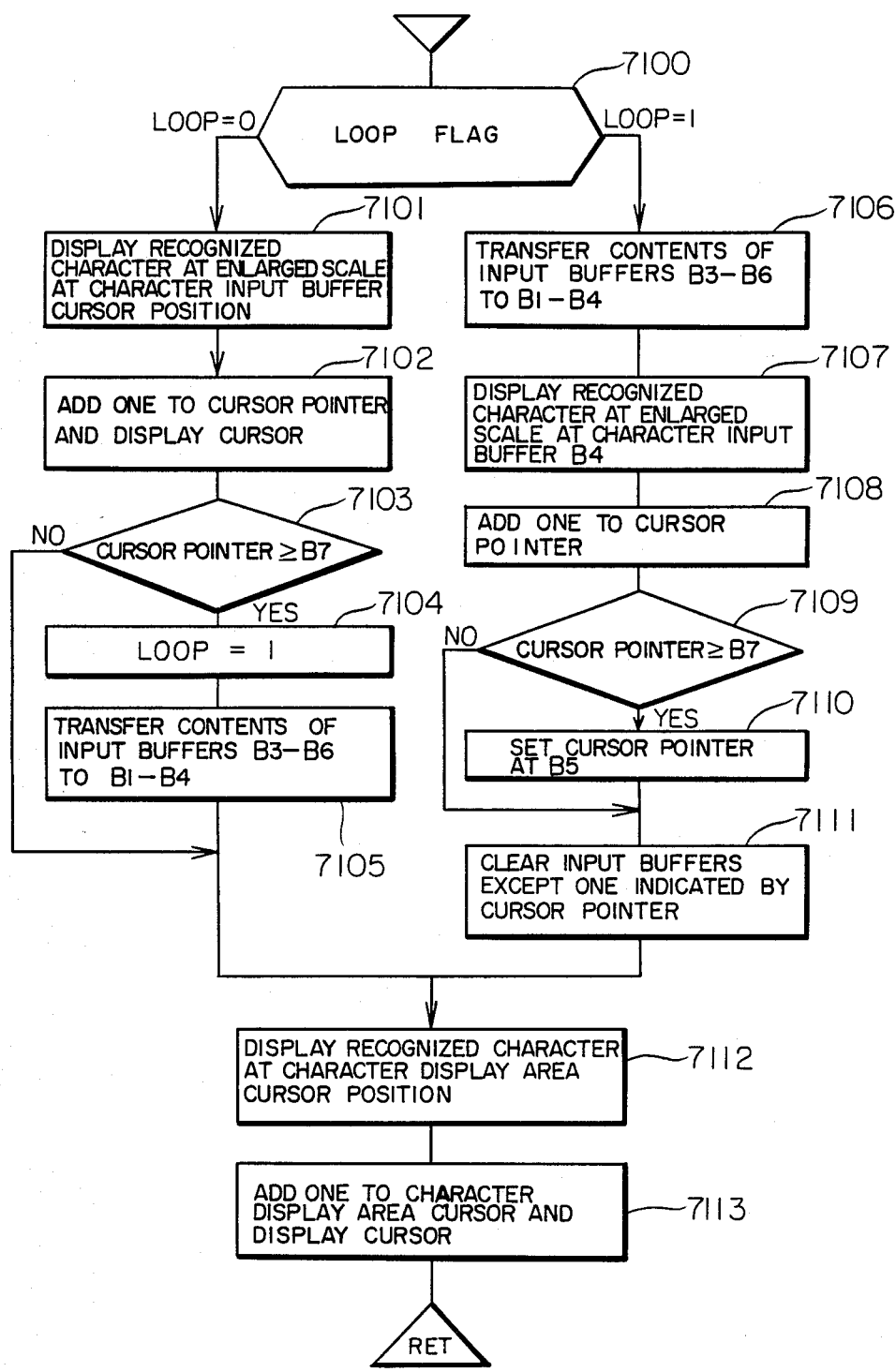

FIG. 12 is a flow executing the operation of the above embodiment and corresponds to the process 700 of FIG. 6.

In this embodiment, a loop flag 130 is provided as shown in FIG. 10. This loop flag is set at "1" when a character is first inputted in the character input buffer B7 and recognized, after all the buffers are cleared. Therefore, in FIG. 12, the processes 7101 to 7105 are executed in case where the loop flag is not set. When the cursor pointer indicates the buffer B7, the loop flag is set to execute the processes 7106 to 7111. Since this loop flag is maintained set at "1" until the "clear" menu is processed, the cursor pointer of the character input buffers operates circularly between the buffers B5 to B7 as described previously, thus realizing the operation as shown in FIGS. 11a, 11b and 11c.

Since the character input buffers B1 to B4 are sequentially shifted to the left in this embodiment, a word or words can be displayed within the buffer areas prior to inputting a character. Therefore, it is advantageous in that a word or words can easily be read. Obviously, similarly to the first embodiment of the present invention, a consecutive character input can be carried out without using the "execution" menu as conventional.

We claim:

1. A handwritten character input system for a handwritten character recognizing device, comprising:
   character input/display buffer areas to which a plurality of handwritten characters can be inputted and on which recognized characters of said inputted handwritten characters can be displayed;
   a first cursor pointer for indicating an input buffer area for a handwritten character to be next inputted, among said character input buffer areas;
   a character recognizing unit connected to said buffer areas for recognizing a handwritten character inputted to each of said buffer areas;
   a recognized character display area connected to said character recognizing unit for displaying all characters recognized by said character recognizing unit;
   a second cursor pointer for indicating a display position for a recognized character to be next displayed, within said recognized character display area; and
   process means connected to all of the above constituent elements for recognizing, in response to the start of a new handwritten character input to the input buffer area after the input buffer area indicated by said first cursor pointer, a handwritten character in the input area indicated by said first cursor by means of said character recognizing unit, displaying said recognized character on the display positions of said buffer area and said recognized character display area indicated by said first and second pointers, and renewing the contents of said first and second cursor pointers for said new handwritten characters;
   wherein said first cursor pointer has a function of cyclically indicating said buffer area, and said process means clears the display corresponding to the buffer area indicated by the renewed content of said first cursor pointer to thereby enable an endless input of handwritten characters in said buffer areas without the need for periodic operation of an "execution" or "enter" key; and
   wherein said process means clears not only the content of the input buffer area indicated by the renewed content of said first cursor pointer but also the content of the input buffer area where a next handwritten character is written.

2. A handwritten character input system according to claim 1, wherein said input buffer area where a next handwritten character is written is reverse-displayed.

3. A handwritten character input system according to claim 1, wherein said input buffer area where a next handwritten character is written is highlight-displayed.

4. A handwritten character input system according to claim 1, wherein said input buffer areas include a first buffer area group and a second buffer area group, and said first cursor pointer is circulated within said second group after the content of said first cursor pointer is renewed to indicate said second buffer area group from said first buffer area group.

5. A handwritten character recognition and display device, comprising:
   input-display means, in the form of a laminated flat display panel device having a handwritten character input area and a recognized standard character display area, for inputting handwritten characters and displaying standard characters, said handwritten character input area including a sequence of character buffers into which handwritten characters can be written and on which recognized standard characters corresponding to the inputted handwritten characters can be displayed;
   character recognizing means connected to said input-display means for recognizing handwritten characters written into said character buffers and for identifying standard characters corresponding to recognized handwritten characters;
   first cursor means for indicating one of said character buffers on said handwritten character input area into which a handwritten character is to be next written;
   second cursor means for indicating a display position on said recognized standard character display area where a recognized standard character is to be next displayed; and
   process means, connected to said input-display means, said character recognizing means and said first and second cursor means, for;
   (a) erasing a handwritten character in a first character buffer indicated by said first cursor means and displaying in that character buffer the corresponding standard character identified by said character recognizing means when a handwritten character is written into the character buffer;
   (b) controlling said first cursor means to indicate a second character buffer next in the sequence adjacent said first character buffer;
   (c) displaying the standard character in said first character buffer at a first display position of said recognized standard character display area indicated by said cursor means when a handwritten character is being written into said second character buffer so that a standard character is displayed at said recognized standard character display area without the need for periodic operation of an "execution" or "enter" key; and
   (d) controlling said second cursor means to indicate a second display position adjacent to said first display position on a said recognized standard character display area; and
   (e) erasing any standard character in at least one character buffer displaced from said second character buffer by a predetermined number of character buffers during the writing of a handwritten character in said second character buffer.

6. A handwritten character recognition and display device according to claim 5, wherein said process means erases any standard character in not more than two character buffers displaced from said second character buffer.

7. A handwritten character recognition and display device according to claim 5, wherein said process means erases any standard character in only two character buffers displaced from said second character buffer.

8. A handwritten character recognition and display device according to claim 5, wherein said first cursor means includes means for indicating a character buffer by reverse-display.

9. A handwritten character recognition and display device according to claim 5, wherein said first cursor means includes means for indicating a character buffer by highlighting.

10. A method of handwritten character recognition and display in a system having input-display means, having a handwritten character input area and a recognized standard character display area, for inputting handwritten characters and displaying standard characters, said handwritten character input area including a sequence of character buffers into which handwritten characters can be written and on which recognized standard characters corresponding to the inputted handwritten characters can be displayed; character recognizing means connected to said input-display means for recognizing handwritten characters written into said character buffers and for identifying standard characters corresponding to recognized handwritten characters; first cursor means for indicating one of said character buffers on said handwritten character input area into which a handwritten character is to be next written; second cursor means for indicating a display position on said recognized standard character display area where a recognized standard character is to be next displayed; the method comprising the steps of:

(a) erasing a handwritten character in a first character buffer indicated by said first cursor means and displaying in that character buffer the corresponding standard character identified by said character recognizing means when a handwritten character is written into the character buffer;

(b) controlling said first cursor means to indicate a second buffer next in the sequence adjacent said first character buffer;

(c) displaying the standard character in said first character buffer at a first display position of said recognized standard character display area indicated by said cursor means when a handwritten character is being written into said second character buffer so that a standard character is displayed at said recognized standard character display area without the need for periodic operation of an "execution" or "enter" key; and (d) controlling said second cursor means to indicate a second display position adjacent to said first display position on said recognized standard character display area.

11. A method according to claim 10, further comprising the step of:

(e) erasing any standard character in at least one character buffer displaced from said second character buffer by a predetermined number of character buffers during the writing of a handwritten character in said second character buffer.

12. A method according to claim 11, wherein said step (e) comprises erasing any standard character in not more than two character buffers.

13. A method according to claim 11, wherein said step (e) comprises erasing any standard character in only two character buffers.

* * * * *